United States Patent
Kunitake et al.

[11] Patent Number: 5,956,430
[45] Date of Patent: *Sep. 21, 1999

[54] IMAGE INFORMATION CODING APPARATUS AND METHOD USING CODE AMOUNT OF A SELECTED PIXEL BLOCK FOR CHANGING CODING PARAMETER

[75] Inventors: Setsu Kunitake; Shun-ichi Kimura; Taro Yokose; Yutaka Koshi; Koh Kamizawa, all of Nakai-machi, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/726,410

[22] Filed: Oct. 3, 1996

[30] Foreign Application Priority Data

Feb. 19, 1996 [JP] Japan ................................ 8-030398

[51] Int. Cl.$^6$ ........................................ G06T 9/00
[52] U.S. Cl. ................ 382/246; 382/272; 382/282; 382/305; 348/399; 348/405; 348/420; 358/433
[58] Field of Search ................. 382/246, 282, 382/272, 305, 234, 239, 232, 244, 270; 358/432, 433, 427, 426; 348/405, 404, 420, 399, 419, 425, 406, 407, 390; 341/51

[56] References Cited

U.S. PATENT DOCUMENTS

| | | | |
|---|---|---|---|
| 4,151,404 | 4/1979 | Harrington et al. | 377/5 |
| 4,262,534 | 4/1981 | Morrison | 73/863.86 |
| 4,581,638 | 4/1986 | Chiariglione et al. | 348/420 |
| 4,805,218 | 2/1989 | Bamberg et al. | 704/241 |
| 4,888,795 | 12/1989 | Ando et al. | 348/18 |
| 4,920,487 | 4/1990 | Baffes | 395/675 |
| 5,025,400 | 6/1991 | Cook et al. | 345/425 |
| 5,028,784 | 7/1991 | Arakawa et al. | 250/584 |
| 5,121,216 | 6/1992 | Chen et al. | 358/261.3 |
| 5,337,087 | 8/1994 | Mishima | 348/405 |
| 5,460,054 | 10/1995 | Tran | 73/863.61 |
| 5,675,424 | 10/1997 | Park | 358/426 |
| 5,680,482 | 10/1997 | Liu et al. | 382/233 |

FOREIGN PATENT DOCUMENTS

| | | |
|---|---|---|
| A-3-195179 | 8/1991 | Japan . |
| A-4-87468 | 3/1992 | Japan . |

OTHER PUBLICATIONS

"Bit–Rate Control Method for DCT Image Coding", Keiji Nemoto et al., p. 46. Proceedings of the 1989 IEICE Autumn Conference D–45.

"An International Standard in Multi–Media Coding Method", H. Yasuda, Maruzen Co., Ltd., Jun. 1991, pp. 14–47.

Primary Examiner—Edward L. Coles
Assistant Examiner—David Rosenblum
Attorney, Agent, or Firm—Oliff & Berridge, PLC

[57] ABSTRACT

An image information coding apparatus includes a block generator for dividing image information into pixel blocks, each of which consists of a predetermined number of pixels. A block selector selects a pixel block in a position different from that of a pixel block selected in a preceding block line in a main scanning direction from the pixel blocks generated by the block generator. A parameter setting device sets a coding parameter to a predetermined value. A first variable-length coding device conducts variable-length coding of the pixel block selected by the block selector using the coding parameter. A code amount controller changes a value of the coding parameter so that the code amount of the pixel block selected by the block selector and coded by the first variable-length coding device is not more than a predetermined code amount, and a second variable-length coding device conducts variable-length coding of all of the pixel blocks using a coding parameter changed by the code amount controller.

13 Claims, 12 Drawing Sheets

☒ : PIXEL BLOCK SELECTED AS REPRESENTATIVE BLOCK

PIXEL BLOCK: p PIXELS × p LINES

☒ : PIXEL BLOCK SELECTED AS REPRESENTATIVE BLOCK

PIXEL BLOCK: p PIXELS x p LINES

☒ : PIXEL BLOCK SELECTED AS REPRESENTATIVE BLOCK

PIXEL BLOCK: p PIXELS x p LINES

☒ : PIXEL BLOCK SELECTED AS
REPRESENTATIVE BLOCK

PIXEL BLOCK: p PIXELS x p LINES

☒ : PIXEL BLOCK SELECTED AS
REPRESENTATIVE BLOCK

PIXEL BLOCK: p PIXELS x p LINES

IMAGE INFORMATION CODING APPARATUS AND METHOD USING CODE AMOUNT OF A SELECTED PIXEL BLOCK FOR CHANGING CODING PARAMETER

BACKGROUND OF THE INVENTION

1. Field of the Invention

The present invention relates to an image information coding apparatus executing a process of coding of digital image information.

2. Discussion of the Related Art

As means for coding, there are two kinds of coding methods: a fixed-length coding always resulting in a constant code amount and a variable-length coding resulting in various coding amounts depending on kinds of images. Application of the fixed-length coding is convenient in system construction because the storage capacity can be easily determined in advance. However, in many cases, the fixed-length coding is generally inferior to the variable-length coding in coding efficiency. The digital color image has enormous information amount; therefore the variable-length coding is frequently used.

The Joint Photographic Coding Expert Group (JPEG), an international standard of the static image coding method, is a typical variable-length coding method. FIG. 10 shows a construction of a coding apparatus according to the JPEG, and the following is explanation thereof. In a blocking part 1002, an inputted image 1001 is divided into blocked image informations 1003 each consisting of N×N pixels and then transformed into a transform coefficient 1005 in a discrete cosine transform (DCT) part 1004. The transform coefficient 1005 is quantized in a quantizing part 1006 to generate the quantized transform coefficient 1007, and coded in an entropy coding part 1008 to output a code information 1009.

Problems of the variable-length coding are as follows. The code amount cannot be constant because the characteristics of the inputted image is reflected in the coding efficiency, and besides, there are some cases where high compression ratio cannot be achieved depending on the kind of inputted image or coding parameter. Furthermore, the variable-length coding method generally has complexity in processing, and thereby it is difficult to realize high-speed processing.

The data amount of digital image of a single page is enormous: for example, about 48 MByte in a case of A4 size and 16 pixels/mm. Accordingly, the system dealing with a document including a lot of digital images requires a storing device of a large capacity. Taking the cost problem into consideration, the hard disk device (HDD) is usually employed as the storing device, but in many cases this causes a bottleneck in the whole system processing because of low processing speed in reading and writing. As means for removing the bottleneck, reduction of data amount by introducing a coding method can be considered. That is, reduction of the data amount inputted to/outputted from the HDD results in a shortened storing/reading time in the HDD. In the case of storing an image whose data amount is P [MByte] per a single page in a storing device having reading/writing processing speed of $V_D$ [MByte/s], if coding is carried out with the compression ratio CR, the processing time $T_D$ [s] for storing the code data is expressed as follows:

$$T_D = (P/CR) \cdot (1/V_D) \qquad (1)$$

Supposing that an average processing time of a single page image in the system is $T_{page}$, the following expression (2) should be assured for removing the bottleneck:

$$T_D < T_{page} \qquad (2)$$

Based on the expressions (1) and (2), it is necessary to control the compression ratio CR to satisfy the following expression (3) for removing the bottleneck:

$$CR \geq P/(V_D \cdot T_{max}) \qquad (3)$$

An example of a coding amount control method controlling the compression ratio is described in "Bit-Rate Control Method for DCT Image Coding", Proceedings of the 1989 IEICE Autumn Conference D-45, which is the code amount control method for a coding system similar to the JPEG. The construction is shown in FIG. 11. In a blocking part 1102, an inputted image 1101 is divided into blocked image informations 1103 each consisting of N×N pixels, and in a DCT part 1104, transformed into a transform coefficient 1105. The transform coefficient 1105 is stored in a memory 1106 and then quantized in a quantizing part 1107 to generate a quantized transform coefficient 1108. The quantized transform coefficient 1108 is coded in a variable-length coding (VLC) part 1109 to generate a code amount 1110, which is inputted to a quantizing step measurement/estimation part 1111. Here, the quantizing step is one of coding parameters in this coding system. The quantizing step measurement/estimation part 1111 carries out the coding processes in the quantizing part 1107 and subsequent parts thereto using plural different quantizing step sizes and measures the code amount. Based on the measured value, a constant A and a constant B in the following expression (4) are calculated, and a quantizing step value 1112 for achieving a target code amount is estimated.

$$CL = A \cdot \log(QS) + B \qquad (4)$$

wherein CL is the code amount and QS is the quantizing step.

Then the estimated quantizing step value 1112 is set to the quantizing part 1107 for executing the coding processes in the quantizing part 1107 and subsequent parts thereto. The repeat of the above operations enables the estimation of high precision. The above description is the explanation for one of the conventional examples of the code amount control method.

As the system employing the code amount control method shown in the conventional example 1, a high-speed image information inputting/storing system which reads plural digital image pages from an image reading device having automatic document feeder, consecutively codes them in order, and stores them in the storing device is taken as an example. If the conventional example 1 is applied to this system, the following problems occur:

1) The method in the conventional example 1 requires a memory device for storing an image whose code amount is to be controlled, namely, one page of inputted image information until the coding process is completed. In the high-speed image information inputting/storing system, the image information writing/reading speed is extremely high, and therefore it is necessary to constitute the memory device by an expensive semiconductive memory or the like, thus causing the cost problem.

2) In the conventional example 1, the coding parameter is determined by N times of coding on a single page of inputted image information which is an object whose code amount is to be controlled. Consequently, the process time for coding of the image information to be controlled $T_{ENC}$ is obtained by the following expression (5) assuming that coding process velocity is $V_{ENC}$ [MByte/s]:

$$T_{ENC}=(P/V_{ENC})\cdot N \quad (5)$$

In the high-speed image information inputting/storing system, it is desirable not to interrupt consecutive processing on plural pages for making the best use of high-speed reading of the image reading device. In other words, the coding process part should assure that the following expression (6) is possible wherein the process time of the image reading device for reading one page is T'$_{page}$:

$$T_{ENC}<T'_{page} \quad (6)$$

Then the following expression (7) can be drawn out of the expressions (5) and (6):

$$N \leq (T_{page}\cdot V_{ENC})/P \quad (7)$$

Accordingly, the number of times of repeating N has an upper limit value. On the other hand, lower limit value $N_{min}$ exists and thereby the precision in the code amount control is assured. If the upper limit value obtained by the expression (7) is less than the lower limit value $N_{min}$, it is impossible to carry out the code amount control having sufficient precision.

To resolve the above-described problem 1), a method can be employed in which the image information is divided into rectangular areas each of which consists of (the number of pixels in horizontal direction × the number of lines of the pixel block×n), wherein n is a positive integral number, as shown in FIG. 12, and the code amount control is carried out per every unit of divided area. FIG. 13 is a flow chart showing process procedures according to the method.

The image to be coded is divided into the rectangular areas to the number of n times as many as the area having (the number of pixels in horizontal direction × the number of lines of pixel blocks), namely, block lines (Step 1201). The first one of the divided rectangular areas (that is, the divided area located at the uppermost part of the original image information) is further divided into the pixel blocks consisting of the predetermined number of pixels (Step 1202). A coding parameter B is set to an initial value (Step 1203). Here, the coding parameter B is the parameter which contributes to the amount of the code outputted from the variable-length coding part. All pixel blocks in the rectangular area are compressed into the variable-length codes by the coding parameter B (Step 1204). The amount of code outputted from the variable-length coding part is added thereto, thereby the total code amount C of the rectangular area is calculated (Step 1205). It is examined whether there is a relation indicated by the following expression TA≧C, and (TA-C)≦Th; among the total code amount C, a predetermined target code amount TA and a predetermined threshold value Th (Step 1206). If there is no relation according to the above-mentioned expression, estimation of the value of the coding parameter B is conducted so that the total code amount C satisfies the above-mentioned expression, and the processes of step 1204 and subsequent steps are repeated (Step 1208). If the relation of the expression is found, the variable-length coding part carries out coding of the whole image information to be coded by the parameter B which is currently set (Step 1208), then it is determined whether coding of all rectangular areas in the image to be coded is completed (Step 1209), and if the coding is completed, a series of processes is completed. In the case where coding of all rectangular areas is not completed, the processes of step 1202 and subsequent steps are repeated on rectangular areas located lower to the currently processed rectangular area.

In this method, if it is supposed that n=1, the required capacity of the memory device for the image of A4 size and 16 pixels/mm is approximately 1/400–1/600 of the capacity of the memory device in the case where the image is not divided.

If the coding processing speed is not sufficiently high for the throughput of the system, the method of paralleling of the coding processes is utilized for gaining the processing speed. In the case of parallel coding processes, it is necessary to synchronize the timings of process starting, completing, and so forth. However, the coding processing time for the variable-length coding changes depending on the generated code amount; therefore the satisfying effect of speed-up owing to parallel processing usually cannot be obtained because of the overhead for synchronization. The conventional example 2 is effective to resolve the problem. In the conventional example 2, code amount control is carried out per every unit of divided area, and accordingly, if the code amount control unit and the paralleling unit are rendered equal, the coding processing speeds are approximately the same, thus reducing the overhead for synchronization. Consequently, it turns out that the code amount control per every unit of divided area such as in the conventional example 2 is effective in the speed-up of the coding process.

One of the code amount control methods for resolving the above-described problem 2 is an image data compressing method disclosed by Japanese Patent Application Laid-Open No. Hei. 3-195179 (1991), which is supposed to be the conventional example 3 of the code amount control. A flow chart showing process procedures in the conventional example 3 is shown in FIG. 14 and an example of area division and selection of representative blocks is shown in FIG. 15.

At first, the image to be coded is divided into pixel blocks each consisting of the predetermined number of pixels (Step 1401). Then the image to be coded is divided into plural areas as shown in FIG. 15 and a pixel block located at the specific position of each area is assumed to be the representative block (Step 1402). A cut-off frequency parameter F is set to an initial value (Step 1403). Here, the cut-off frequency parameter F is the parameter which contributes the amount of code outputted from the variable-length coding part. Next, DCT is carried out on the selected representative block, thereby each block is coded by the parameter F and the compression ratio of each block is obtained (Step 1404). The average value Y of the compression ratios of the representative blocks is calculated (Step 1405), and it is examined whether the average value Y of the compression ratios is close to the target compression ratio X (Step 1406). If the average value Y is close to the target compression ratio X, the coding by the cut-off frequency parameter F which is currently set is conducted on the whole image information to be coded (Step 1410), and a series of processes is completed. If the average value Y is not close to the target compression ratio X, the values Y and X are compared with each other (Step 1407). In the case where the value Y is smaller than the value X, the cut-off frequency parameter F is raised and the processes of step 1404 and the subsequent steps are repeated (Step 1408). In the case where the value Y is larger than the value X, the cut-off frequency parameter F is lowered and the processes of step 1404 and the subsequent steps are repeated (Step 1409).

Japanese Patent Application Laid-Open No. Hei. 4-87468 (1992) discloses an image data compression method which is similar to the conventional example 3 of the code amount control. The image data compression method is assumed to be a conventional example 4 of the code amount control. A flow chart showing process procedures in the conventional example 4 is shown in FIG. 16 and an example of area division and selection of representative blocks is shown in FIG. 17.

At first, the image to be coded is divided into pixel blocks each of which consists of the predetermined number of pixels (Step 1601). After division, the number of pixel blocks is M×N. Next, plural I columns of block lines are selected from M columns of block lines and plural J rows of block lines are selected from N rows of block lines in the image to be coded, and pixel blocks constituting those selected columns and rows are determined to be the representative blocks (Step 1602). A cut-off frequency parameter F is set to an initial value (Step 1602). Here, the cut-off frequency parameter F is the parameter which contributes to the amount of code outputted from the variable-length coding part. The selected representative blocks are coded by the cut-off frequency parameter F (Step 1604), the compression ratio of each block is calculated (Step 1605), and the average value Y of the compression ratios of the representative blocks is obtained (Step 1606). It is examined whether the average value Y of the compression ratios is close to the target compression ratio X (Step 1607). If the average value Y is close to the target compression ratio X, the whole image information to be coded is coded by the cut-off frequency parameter F which is currently set (Step 1611), and then a series of processes is completed. If the average value Y is not close to the target compression ratio X, values of Y and X are compared (Step 1608). If the value Y is smaller than X, the cut-off frequency parameter F is raised and the processes of step 1604 and subsequent steps are repeated (Step 1609). In the case where Y is larger than X, the cut-off frequency parameter F is lowered and the processes of step 1604 and subsequent steps are repeated (Step 1610).

In the conventional examples 3 and 4, if it is supposed that area division of the image is carried out so that the total data amount of the selected representative blocks is 1/M of the data amount of one page of the original image, and that coding is repeated N times in total, the coding process time $T'_{ENC}$ can be calculated by the following expression (8):

$$T'_{ENC}=(P/V_{ENC})\cdot(1/M)\cdot(N-1)+P/V_{ENC} \qquad (8)$$

As it is clear from the expressions (5) and (8), the coding process time in the conventional examples 3 and 4, in particular, the processing time of the code amount control is reduced to 1/M of the processing time in the conventional example 1.

However, if the conventional example 2 of the code amount control is applied, the above-described problem 2) cannot be resolved because it is indispensable to carry out N times of coding process on the whole image information to be coded.

In the conventional examples 3 and 4 of the code amount control, there are no descriptions focusing on the capacity of the memory device in their patent applications, and therefore it seems that the area division of the inputted image and the coding process on the divided area unit on purpose to reduce the capacity of the memory device are not considered. However, according to the description about apparatus in these applications, there is a possibility of applying these conventional examples to the code amount control per every unit of divided area depending upon circumstances. Even if the conventional examples 3 and 4 can be applied to the code amount control per every unit of divided area, there occurs further problems.

As shown in the conventional examples 3 and 4 of the code amount control, in the method of reducing the number of blocks to be coded for shortening the processing time of the code amount control by selecting the representative blocks, the way of selection of the representative blocks has a great influence on precision of the code amount control. Consequently, if the representative blocks do not sufficiently reflect the characteristic of the original image, it is difficult to conduct the high precise prediction of the code amount.

For example, in the case where the code amount control of the conventional example 4 is applied to coding of the image information in which a picture image contains character image parts, there is a possibility of selecting many character image parts as the representative blocks as shown in FIG. 18. If such selection of the representative blocks is conducted, the ratio of the picture image and the character image in the representative blocks is different from that of the original image information, which causes fear of deterioration of precision in the code amount control. Thus, according to such systematic method of selecting the representative blocks, there is a possibility that the representative blocks may reflect the local characteristic of the original image.

In the selection of the representative blocks in the conventional examples 3 and 4, it is necessary to take two-dimensional position of the pixel block in the image information into consideration. In other words, if there is no information about two-dimensional positions of the pixel blocks, it is hard to realize the area division of the image or determination of positions of the representative blocks in the divided area in the conventional example 3, as well as the selection of the representative blocks per unit of column and row in the conventional example 4.

SUMMARY OF THE INVENTION

The present invention has been made in view of the above circumstances and has as an object to provide an image information coding technique which can restrain bad influences caused by the local image characteristics by appropriate selection of representative blocks in the case where the coding parameter is set in accordance with the result of coding of the representative blocks and then optimum coding is carried out on all of the image.

Another object of the present invention is to conduct the code amount control of high precision in a short time using the above image information coding technique, and to reduce the required capacity of the memory device in the apparatus by the code amount control on the image divided into blocks.

A further object of the present invention is to execute the parallel coding processes on every unit of image divided into blocks.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an image information coding apparatus of the present invention comprises block generating means for dividing an image information into pixel blocks each of which consists of a predetermined number of pixels, block selecting means for selecting a pixel block in a position different from that of a pixel block selected in a preceding block line in a main scanning direction from the pixel blocks generated by the block generating means, parameter setting means for setting a coding parameter to a predetermined value, first variable-length coding means for conducting variable-length coding of the pixel block selected by the block selecting means using the coding parameter, code amount controlling means for changing a value of the coding parameter so that the code amount of the pixel block selected by the block selecting means and coded by the first variable-length coding means is not more than a predetermined code amount, and second variable-length coding means for conducting variable-length coding of all of the pixel blocks using a coding parameter changed by the code amount controlling means.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENT

Preferred embodiments of an image information coding apparatus according to the present invention are now described in detail based on the drawings.

First Embodiment

Figure 1:
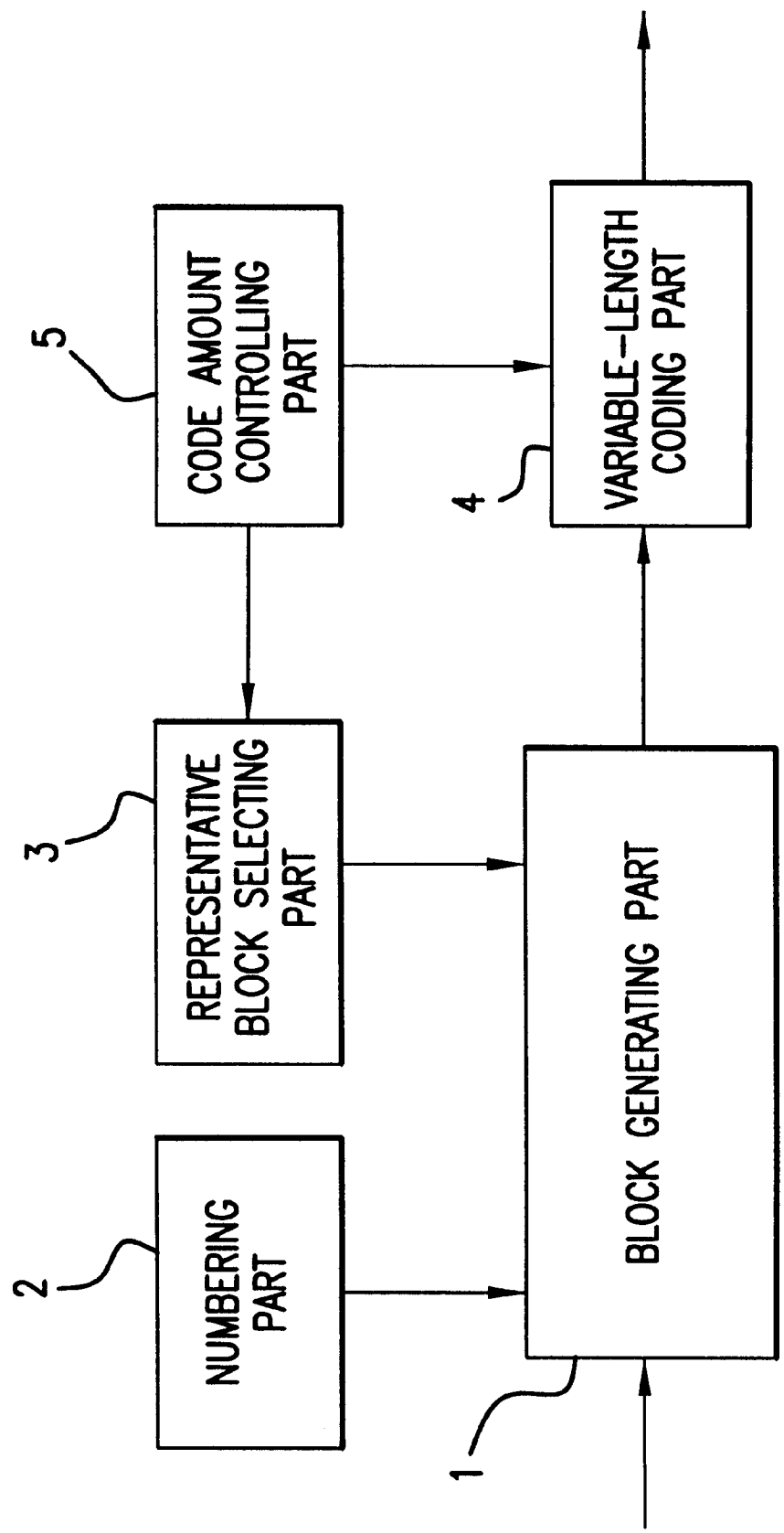
FIG. 1 shows a schematic construction of a first embodiment of an image information coding apparatus according to the present invention.

FIG. 1 is a block diagram showing a first embodiment of an image information coding apparatus according to the present invention. In the figure, reference numeral 1 indicates a block generating part, 2 indicates a numbering part, 3 indicates a representative block selecting part, 4 indicates a variable-length coding part and 5 indicates a code amount controlling part.

Figure 2:
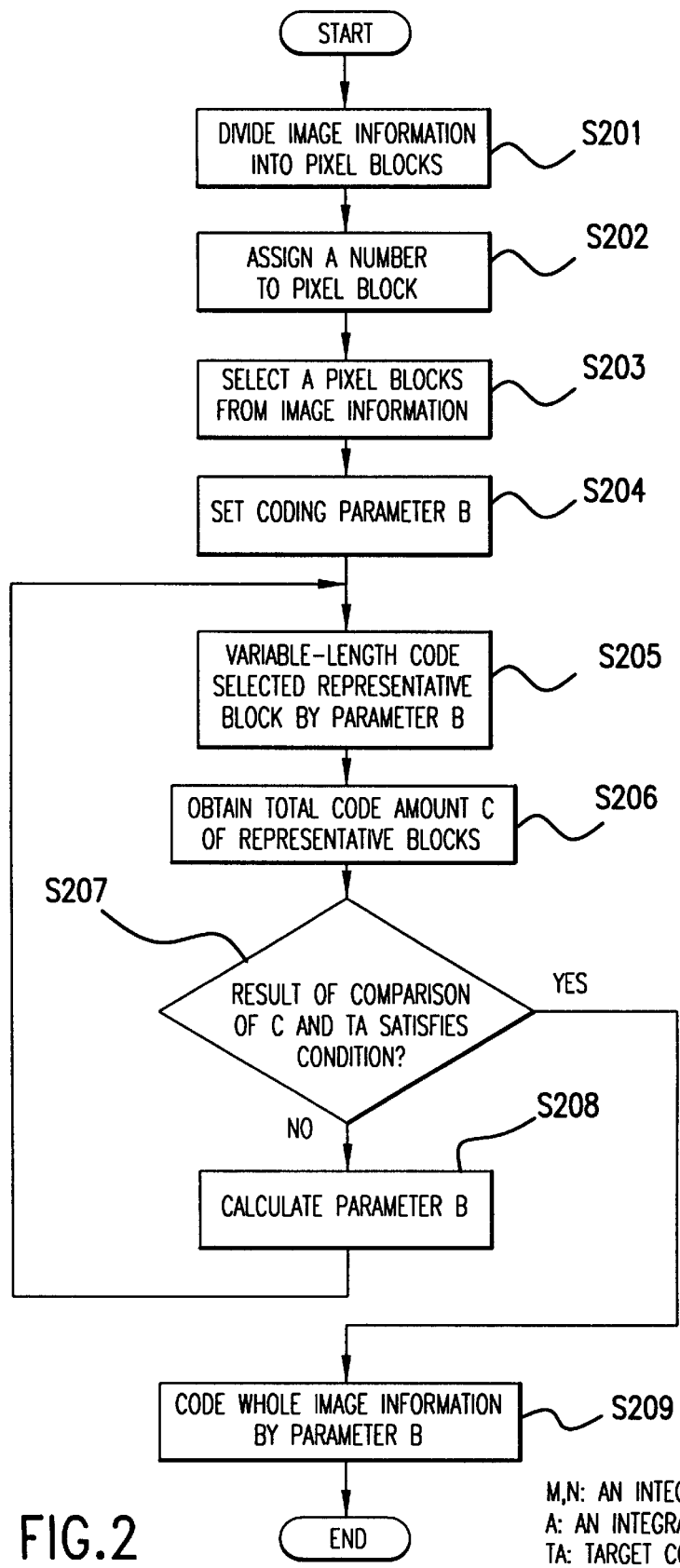
FIG. 2 is a flow chart showing process procedures in the first embodiment of the image information coding apparatus according to the present invention.

FIG. 2 is a flow chart showing process procedures in the current embodiment. The process procedures in the current embodiment of the image information coding apparatus are now described referring to FIG. 2.

In the current embodiment, at first, an image information is divided into pixel blocks each of which consists of the predetermined number of pixels in the block generating part 1 (Step 201). Next, in the numbering part 2, serial numbers are assigned to the generated pixel blocks, for example, in the order from left to right, that is, in the main scanning direction and from the top to the bottom, that is, in the sub scanning direction (Step 202). The main scanning direction refers to the horizontal direction of pixels to be read and the sub scanning direction refers to the vertical direction of pixels to be read. Then, in the representative block selecting part 3, A pixel blocks (A is a positive integral number which is smaller than the number of all pixel blocks contained in the image information) are selected as the representative blocks from the image information utilizing the serial number (Step 203). The code amount controlling part 5 first sets a coding parameter B to an initial value (Step 204). Here, the coding parameter B is the parameter which contributes to the amount of code outputted from the variable-length coding part 4. Next, the variable-length coding part 4 carries out variable-length coding on the representative blocks selected in the representative block selecting part 2 by the coding parameter B (Step 205). The code amount controlling part 5 adds all amounts of codes outputted from the variable-length coding part 4 and obtains the total code amount C of the representative blocks (Step 206). Then the code amount controlling part 5 compares the total code amount C and a predetermined target code amount TA (Step 207). If the result of comparison satisfies a specific condition, the coding process is conducted on the whole image information to be coded in the variable-length coding part 4 by the parameter B which is currently set, and a series of processes is completed (Step 209). If the result of comparison in step 206 does not satisfy the specific condition, the value of the parameter B is predicted and set so that the value of the total code amount C satisfies the condition, and the processes of step 205 and subsequent steps are repeated (Step 208). As it is clear from the flow chart, the process of calculating the coding parameter necessary for controlling the code amount (from step 205 to step 208) is conducted on the selected representative blocks; accordingly, the processing time required for the code amount control can be reduced.

Second Embodiment

Figure 3:
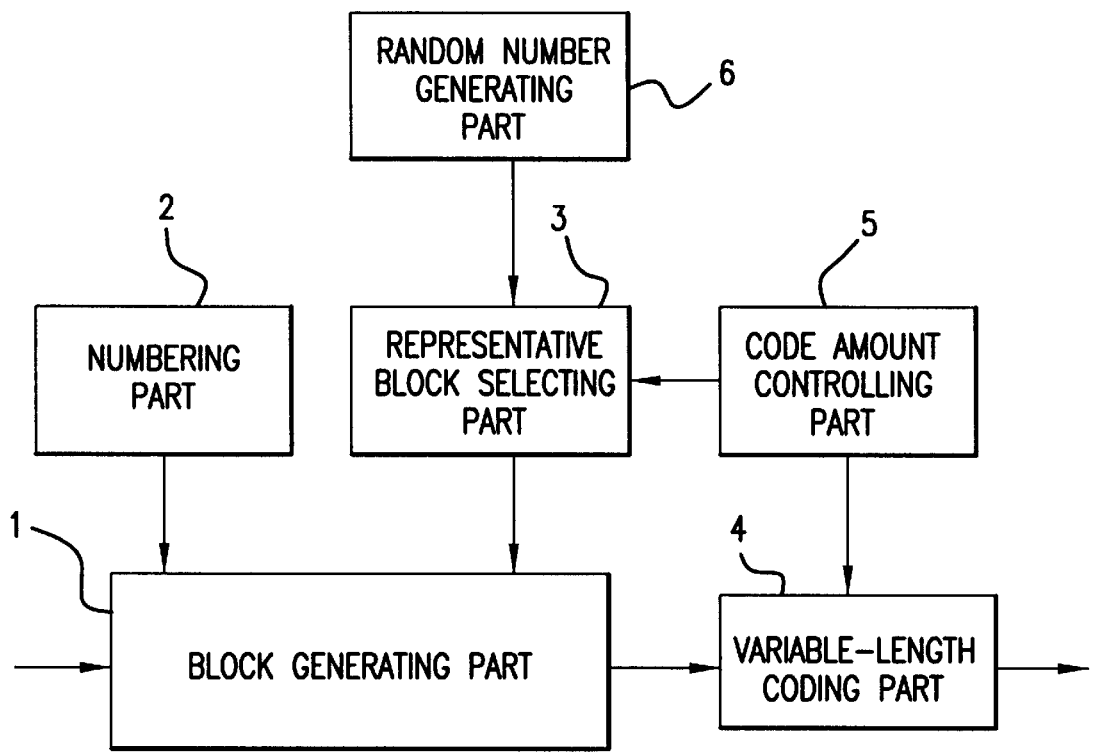
FIG. 3 shows a schematic construction of a second embodiment of the image information coding apparatus according to the present invention.

FIG. 3 is a block diagram showing a second embodiment of the image information coding apparatus according to the present invention. It differs from the first embodiment in that a random number generating part 6 is added to the apparatus. In this embodiment, a random number is generated to the desired number of times in the random number generating part 6 and pixel blocks whose serial numbers assigned by the numbering part 2 are equal to the values of the random numbers are selected as the representative blocks. The random number is generated within a range from the minimum value to the maximum value of the serial number assigned to the pixel blocks.

Figure 4:
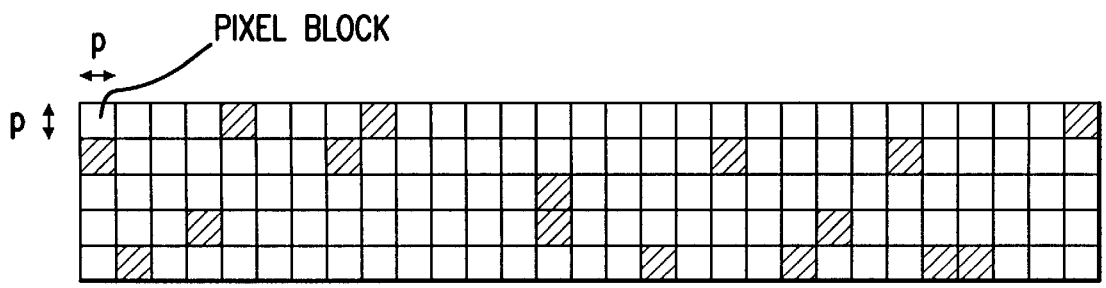
FIG. 4 shows an example of selection of representative blocks in the second embodiment of the image information coding apparatus according to the present invention.

FIG. 4 shows an example of selection of the representative blocks in this embodiment. In the figure, p is an integral number representing both of the number of pixels of the pixel block in the horizontal direction and the number of lines. With the present embodiment, the desired number of representative blocks can be selected from the image information irregularly with ease.

Third Embodiment

Figure 5:
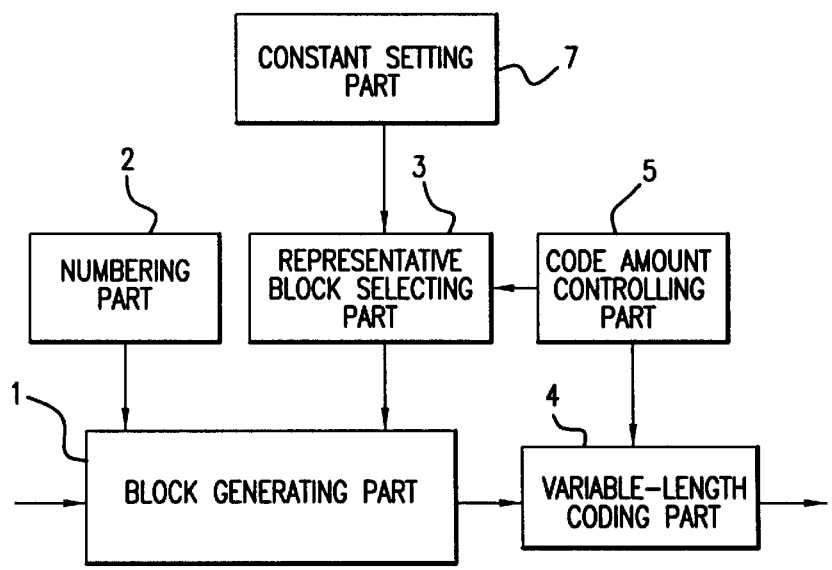
FIG. 5 shows a schematic construction of third and fourth embodiments of the image information coding apparatus according to the present invention.
Figure 6:
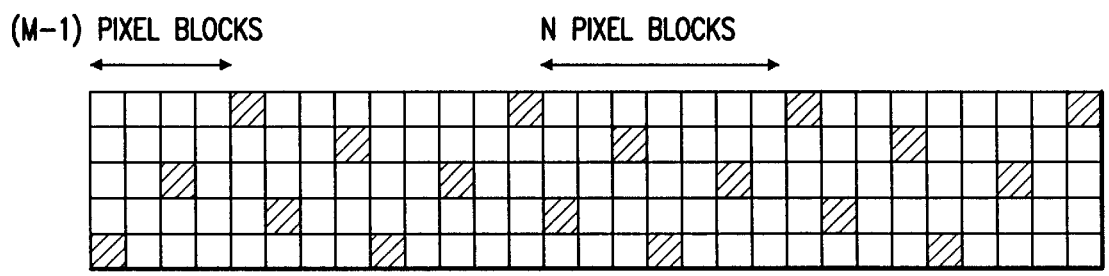
FIG. 6 shows an example of selection of representative blocks in the third embodiment of the image information coding apparatus according to the present invention.

FIG. 5 is a block diagram showing a third embodiment of the image information coding apparatus. The third embodiment differs from the first embodiment in that a constant setting part 7 is added to the apparatus. In this embodiment, the M-th pixel block from the top of the image information is first selected, and after that the pixel blocks are selected at intervals of N pixel blocks. These constants M and N are set at the constant setting part 7. FIG. 6 shows an example of selection of the representative blocks in the third embodiment of the image information coding apparatus according to the present invention. In the figure, p is an integral number representing both of the number of pixels of the pixel block in the horizontal direction and the number of lines. For the image information having 29×p pixels in the horizontal direction and 5×p lines, the selection of the representative blocks is carried out with the setting of constants M=5 and N=7. According to this selection method, the representative block selecting part can be simply constructed because it is unnecessary to take relations of two-dimensional positions of pixel blocks into consideration. Moreover, by changing values of M and/or N, selection of the representative blocks as shown in FIG. 6 hardly reflecting the local characteristics of the image information can be realized regardless of size of the image.

Fourth Embodiment

Figure 7:
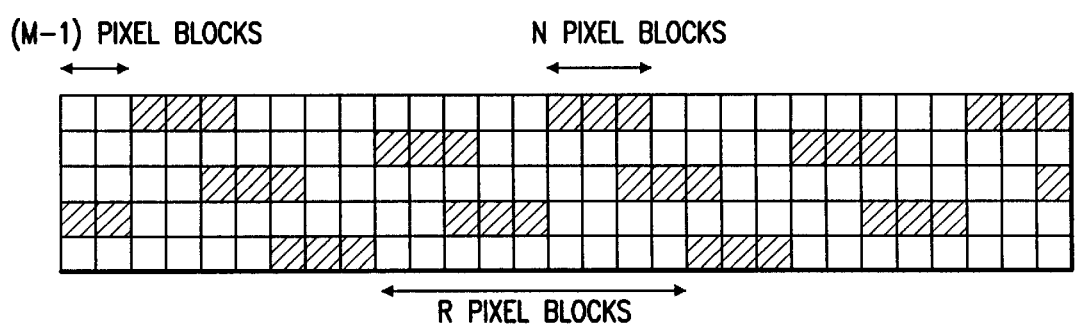
FIG. 7 shows an example of selection of representative blocks in the fourth embodiment of the image information coding apparatus according to the present invention.

The block diagram showing a fourth embodiment of the image information coding apparatus is the same as that of FIG. 5. In the present embodiment, first, M-th pixel block from the top of the image information is selected, and subsequently the pixel blocks to the number of (N−1) are selected. After that, N pixel blocks are selected at intervals of R pixel blocks. These constants M, N and R are set at the constant setting part 7. FIG. 7 shows an example of selection of the representative blocks in the fourth embodiment of the image information coding apparatus of the present invention. In the figure, p is an integral number representing both of the number of pixels of the pixel block in the horizontal direction and the number of lines. For the image information having 29×p pixels in the horizontal direction and 5×p lines, the selection of the representative blocks is carried out with the setting of constants M=3, N=3 and R=9. According to this selection method, the representative block selecting part can be simply constructed because it is unnecessary to take relations of two-dimensional positions of pixel blocks into consideration. Moreover, by changing values of M, N and/or R, selection of the representative blocks as shown in FIG. 7 hardly reflecting the local characteristics of the image information can be realized regardless of size of the image. Furthermore, in the case where the coding method utilizes the correlativity between one pixel block and another located immediately before (in the JPEG, the DC component of the DCT constant is obtained by coding the difference from the DC component of the pixel block immediately before), there occurs a possibility of deterioration in precision of the prediction if the representative blocks are not sequential at all in the horizontal direction as FIG. 6 (That is, the total code amount predicted based on the code amount of the representative blocks is different from the target code amount). In the present embodiment, it can be expected that the precision of the prediction is further improved in the coding method utilizing correlativity between adjacent pixel blocks.

Fifth Embodiment

Figure 8:
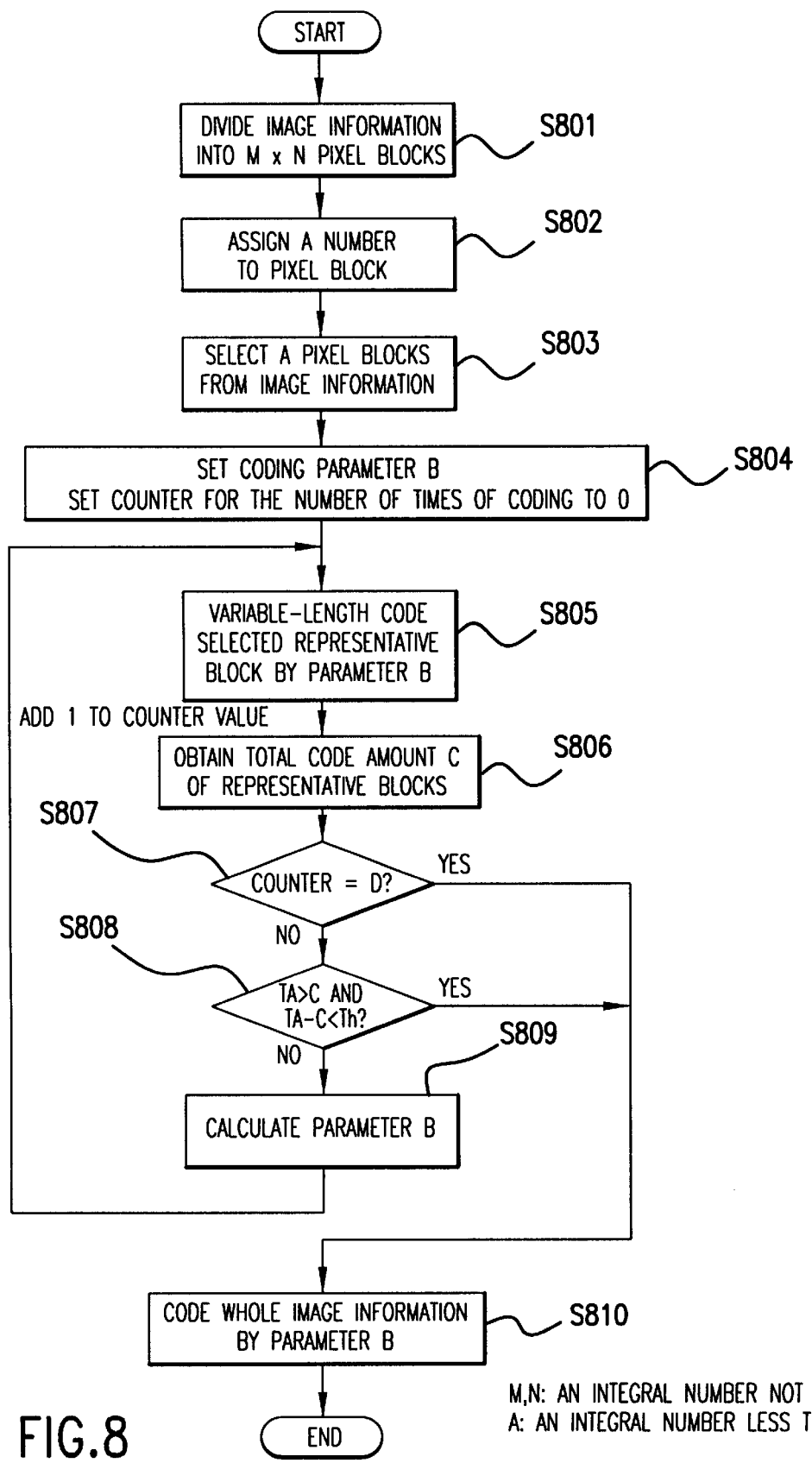
FIG. 8 is a flow chart showing process procedures in a fifth embodiment of the image information coding apparatus according to the present invention.

FIG. 8 is a flow chart showing process procedures in a fifth embodiment of the image information coding apparatus according to the present invention. The construction of the present embodiment is the same as those shown in FIGS. 1, 3 and 5. The process procedures are described referring to FIG. 8.

In this embodiment, at first, an image information is divided into pixel blocks each of which consists of pixels of the predetermined number in the block generating part 1 (Step 801). Next, in the numbering part 2, serial numbers are assigned to the generated pixel blocks, for example, in the order from left to right and from the top to the bottom (Step 802). Then, in the representative block selecting part 3, A pixel blocks (A is a positive integral number smaller than the number of all pixel blocks contained in the image information) are selected as the representative blocks from the image information utilizing the serial number (Step 803). The code amount controlling part 5 first sets a coding parameter B to an initial value and sets a counter for the number of times of coding (counter) to 0 (Step 804). Here, the coding parameter B is the parameter which contributes to the amount of code outputted from the variable-length coding part 4. Next, the variable-length coding part 4 conducts coding on the representative blocks selected in the representative block selecting part 2 by the coding parameter B to generate the variable-length code, and adds 1 to the value of the counter (Step 805). The code amount controlling part 5 adds the amounts of codes outputted from the variable-length coding part 4 to obtain a total code amount C of the representative blocks (Step 806). The code amount controlling part 5 examines whether the value of the counter is equal to the predetermined upper limit value D of the repeating number of times of coding (Step 807). If the value of the counter is equal to the upper limit value D, the coding process is conducted on the whole image information to be coded by the coding parameter B which is currently set, and series of processes is completed (Step 810). If the value of the counter is not equal to the upper limit value D, the code amount controlling part 5 examines whether there is a relation indicated by the following expression (6) among the total code amount C, the predetermined target code amount TA, and a predetermined threshold value Th (Step 808):

$$TA \geq C, \text{ and } (TA-C) \leq Th \tag{6}$$

If the expression (6) is possible, the coding process is conducted on the whole image information to be coded by the coding parameter B which is currently set, and a series of processes is completed (Step 810). If there is no relation of the expression (6), the value of the parameter B is predicted and set so that the value of the total code amount C satisfies the expression (6), and then the processes of step 805 and subsequent steps are repeated (Step 809).

In the present embodiment, the possibility that the ultimate result of the code amount control does not exceed the target code amount is increased by the determination in step 808, and moreover, bad influence on the quality of the decoded image caused by unnecessarily high compression ratio can be prevented by adding the threshold determination. Furthermore, setting the limitation on the the repeating number of times of coding in step 807 can assure the worst-case value of the coding process time in advance.

Sixth Embodiment

Figure 9:
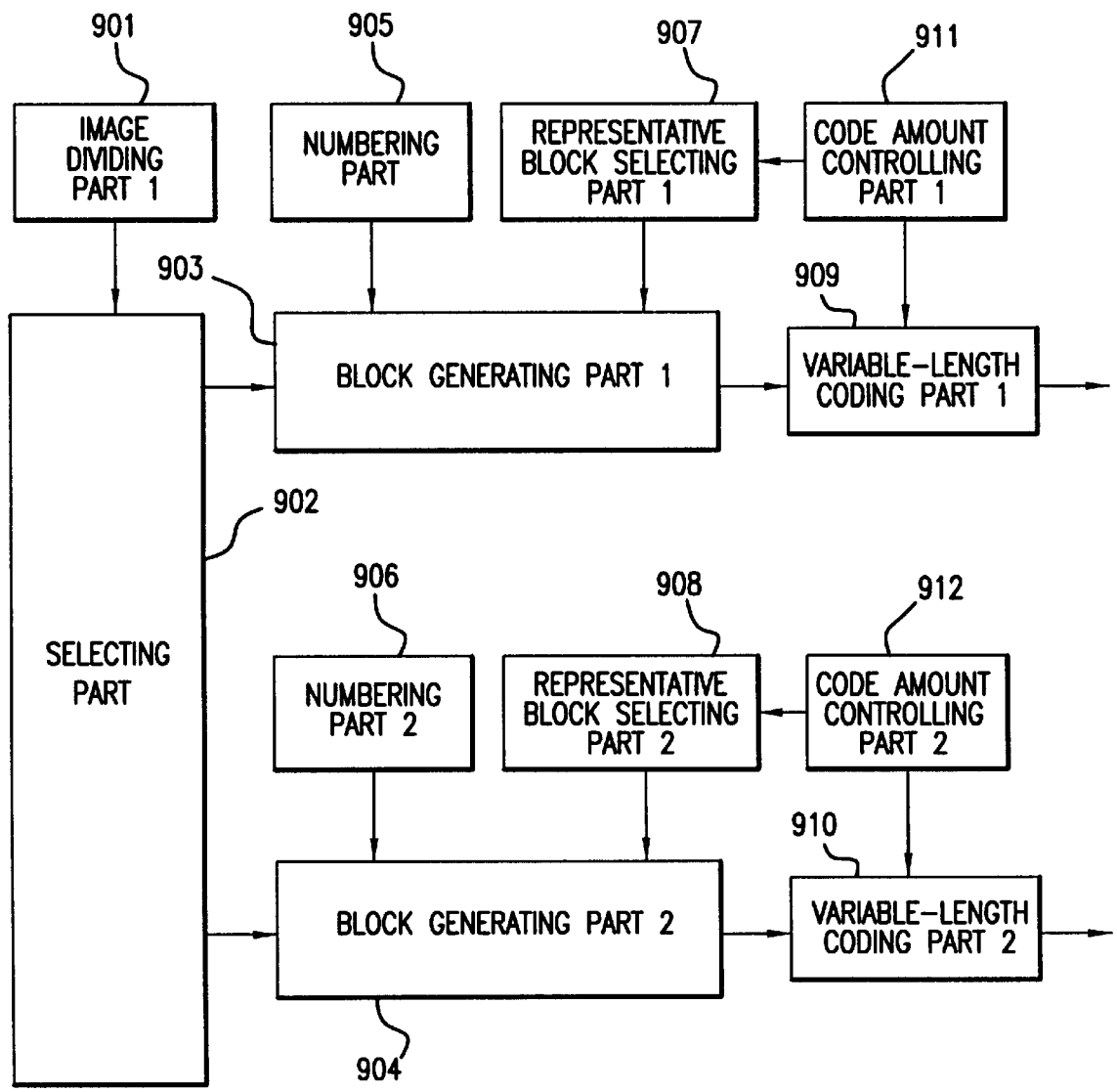
FIG. 9 shows a schematic construction of a sixth embodiment of the image information coding apparatus according to the present invention.
Figure 10:
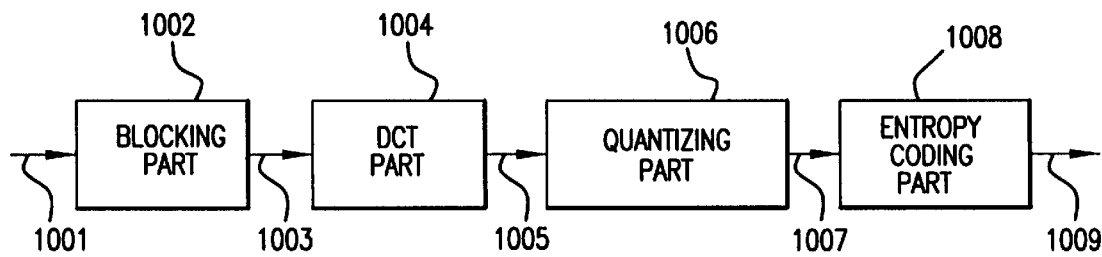
FIG. 10 shows a schematic construction of a variable-length coding apparatus of a conventional example.
Figure 11:
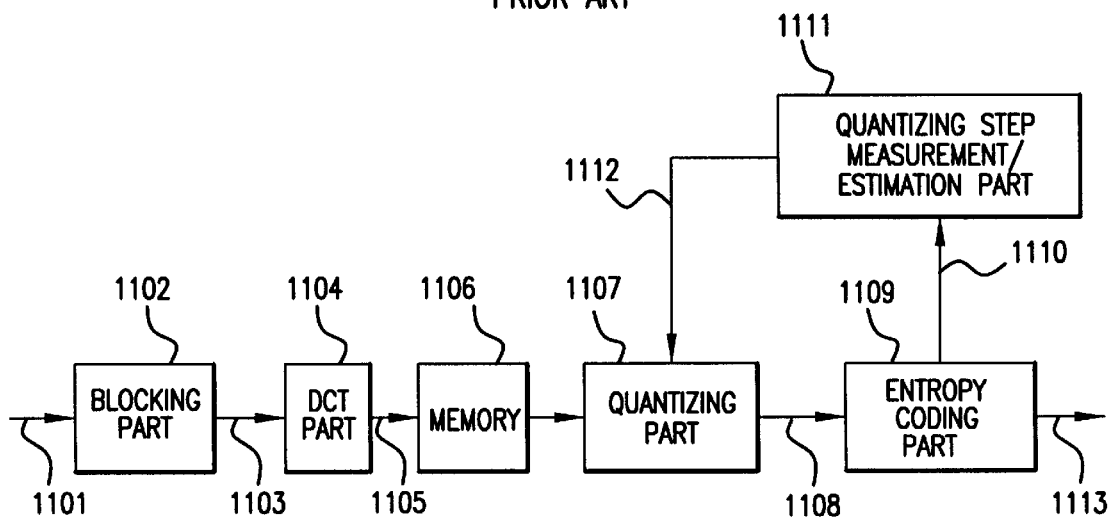
FIG. 11 shows a schematic construction of a coding apparatus having a code amount control function in a conventional example 1.

FIG. 9 is a block diagram showing a sixth embodiment of the image information coding apparatus according to the present invention. In this embodiment, the parallel processing is realized by executing image division. In FIG. 9, the reference numeral 901 indicates an image dividing part, 902 indicates selecting part, 903 and 904 indicate block generating parts, 905 and 906 indicate numbering parts, 907 and 908 indicate representative block selecting parts, 909 and 910 indicate variable-length coding parts, and 911 and 912 indicate code amount controlling parts.

The present embodiment has plural block generating parts, numbering parts, representative block selecting parts, variable-length coding parts and code amount controlling parts. FIG. 9 shows the case where the number of each of these parts is 2.

The operations are now explained. Here, the block generating part 1, the numbering part 1, the representative block selecting part 1, the variable-length coding part 1 and code amount controlling part 1 are collectively referred to as a coding part 1, and in the same way, the block generating part 2, the numbering part 2, the representative block selecting part 2, the variable-length coding part 2 and code amount controlling part 2 are collectively referred to as a coding part 2.

Here the case is shown in which the construction of the coding part 1 and the coding part 2 is the same as that of the first embodiment (shown in FIG. 1), but it can be the same as those of the second, third or fourth embodiments (FIGS. 3 or 5).

Figure 12:
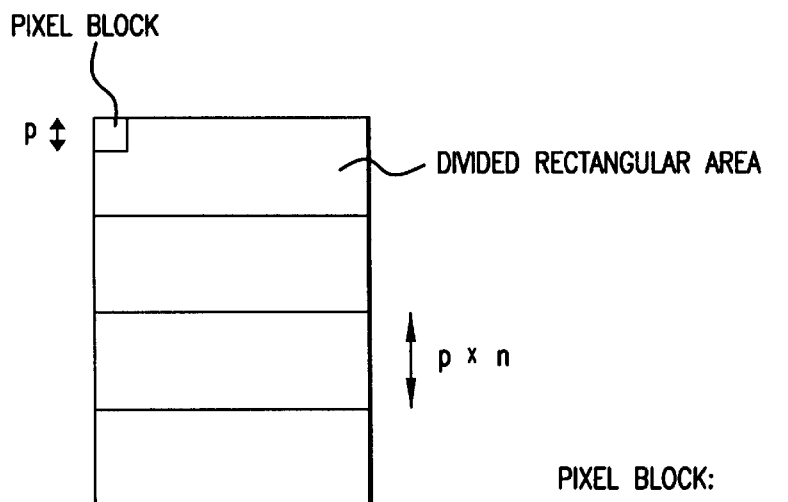
FIG. 12 illustrates a principle of a coding apparatus having a code amount control function in a conventional example 2.
Figure 13:
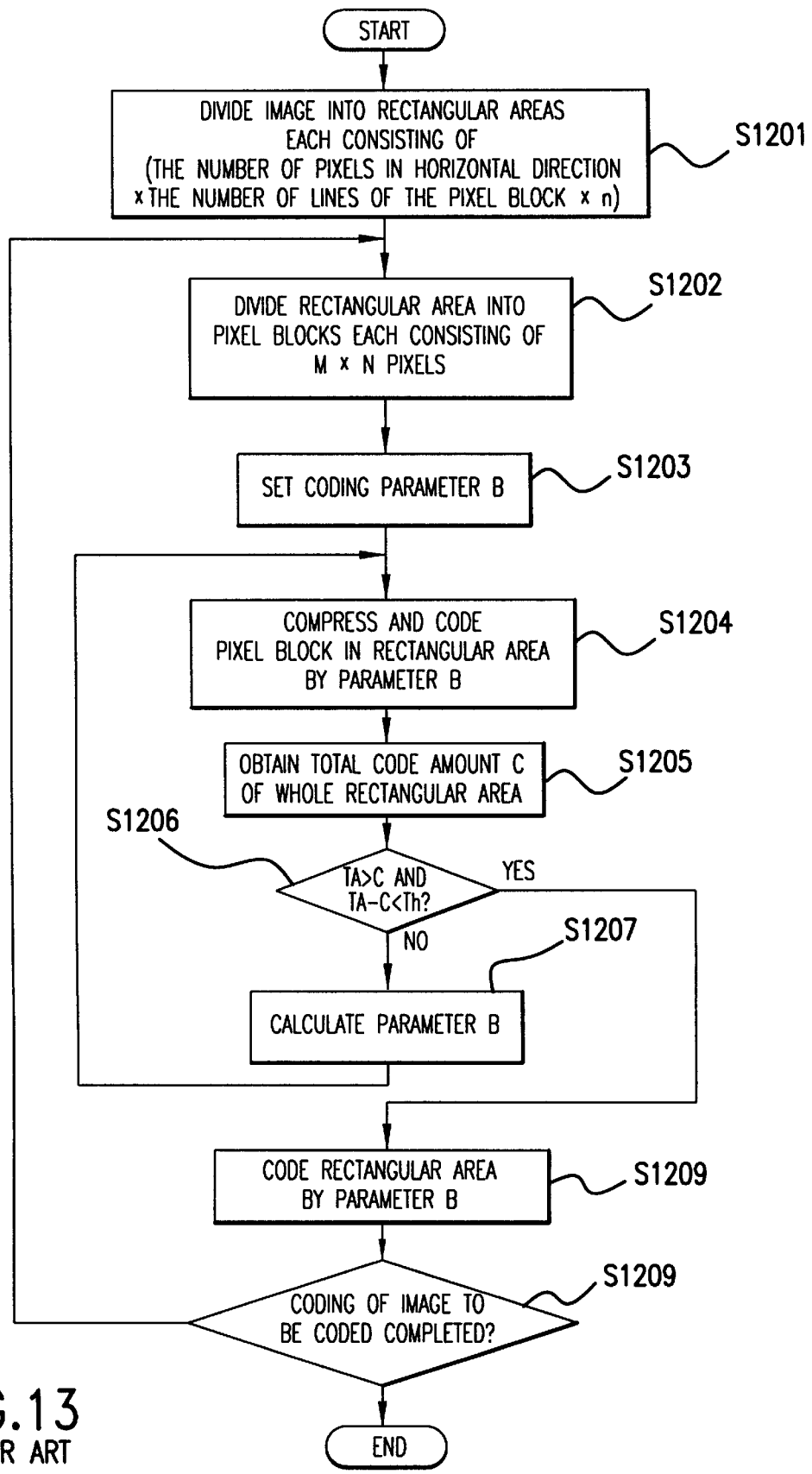
FIG. 13 is a flow chart showing process procedures in the conventional example 2.
Figure 14:
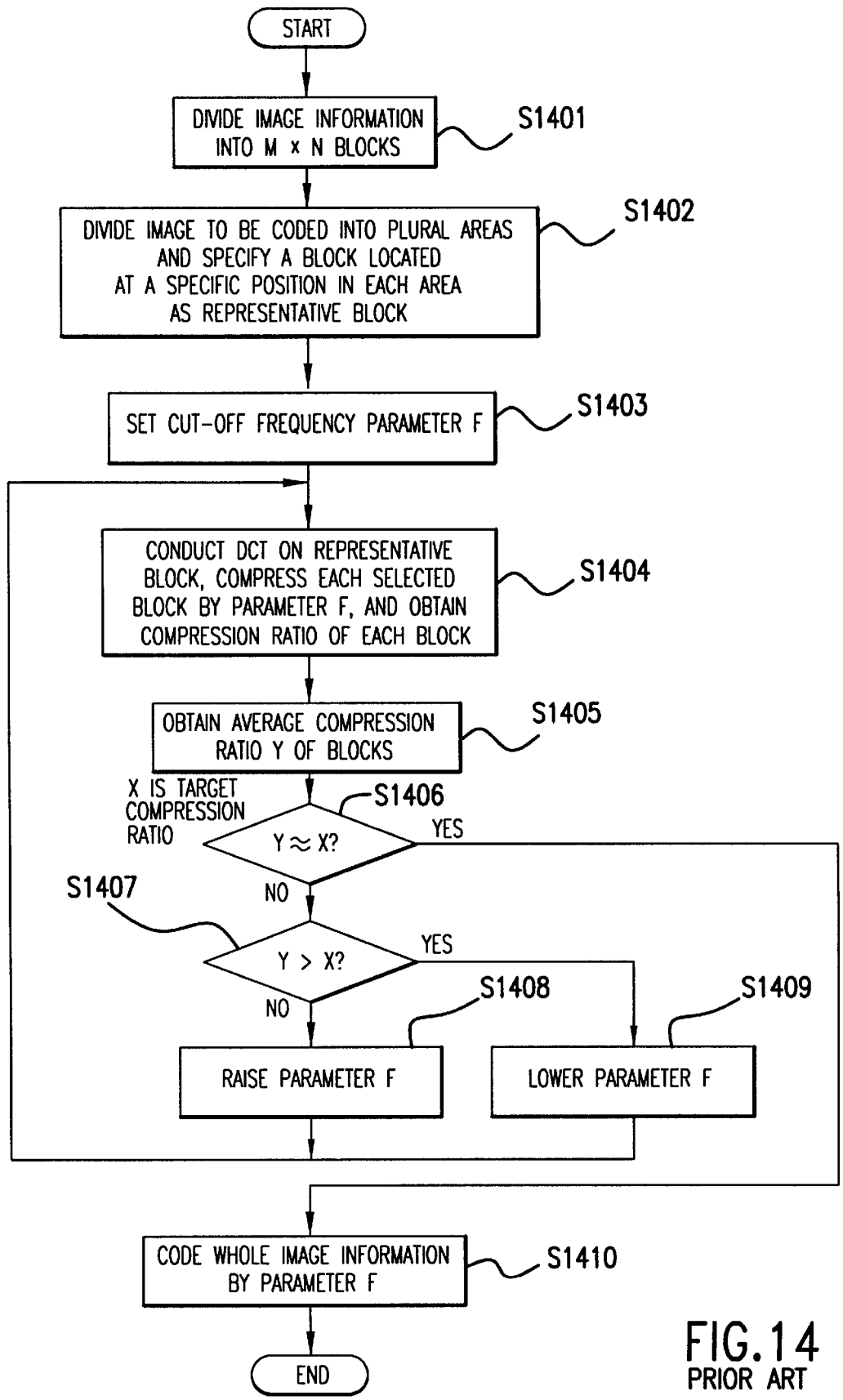
FIG. 14 is a flow chart showing process procedures in a conventional example 3.
Figure 15:
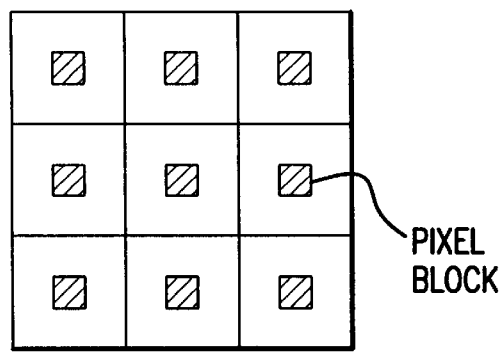
FIG. 15 shows an example of selection of representative blocks in the conventional example 3.
Figure 17:
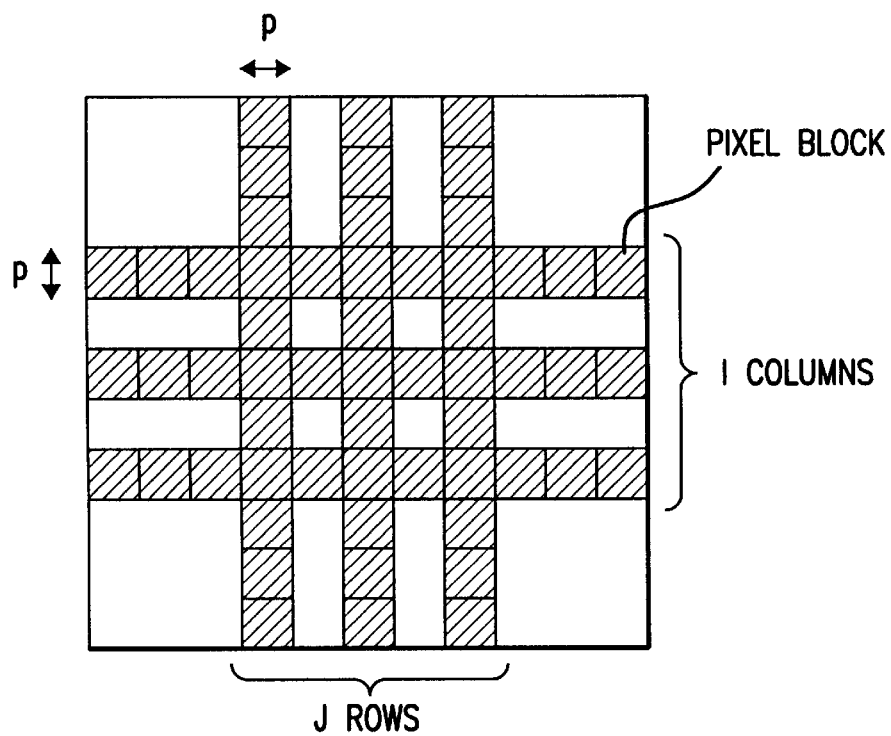
FIG. 17 shows an example of selection of representative blocks in the conventional example 4.
Figure 16:
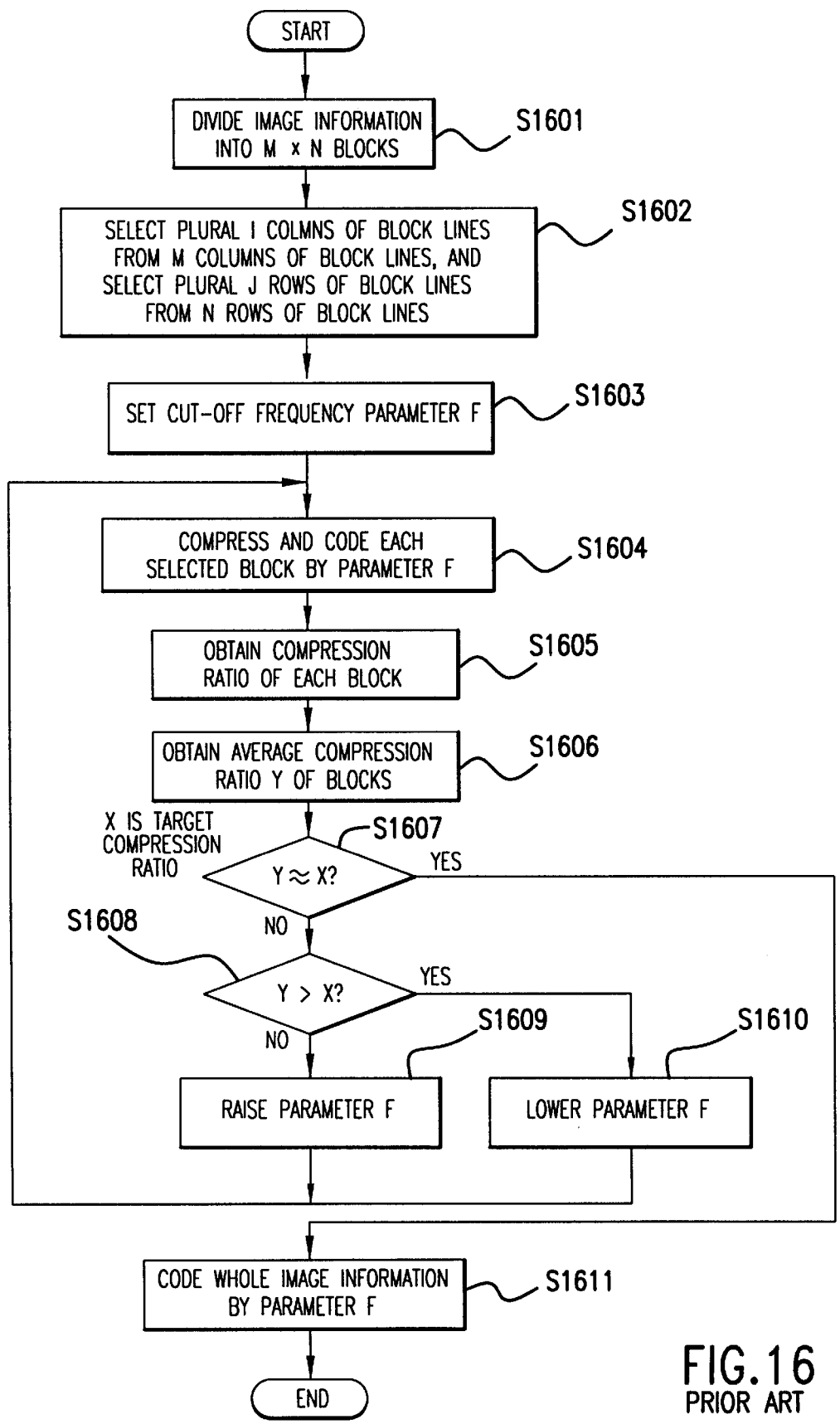
FIG. 16 is a flow chart showing process procedures in a conventional example 4.
Figure 18:
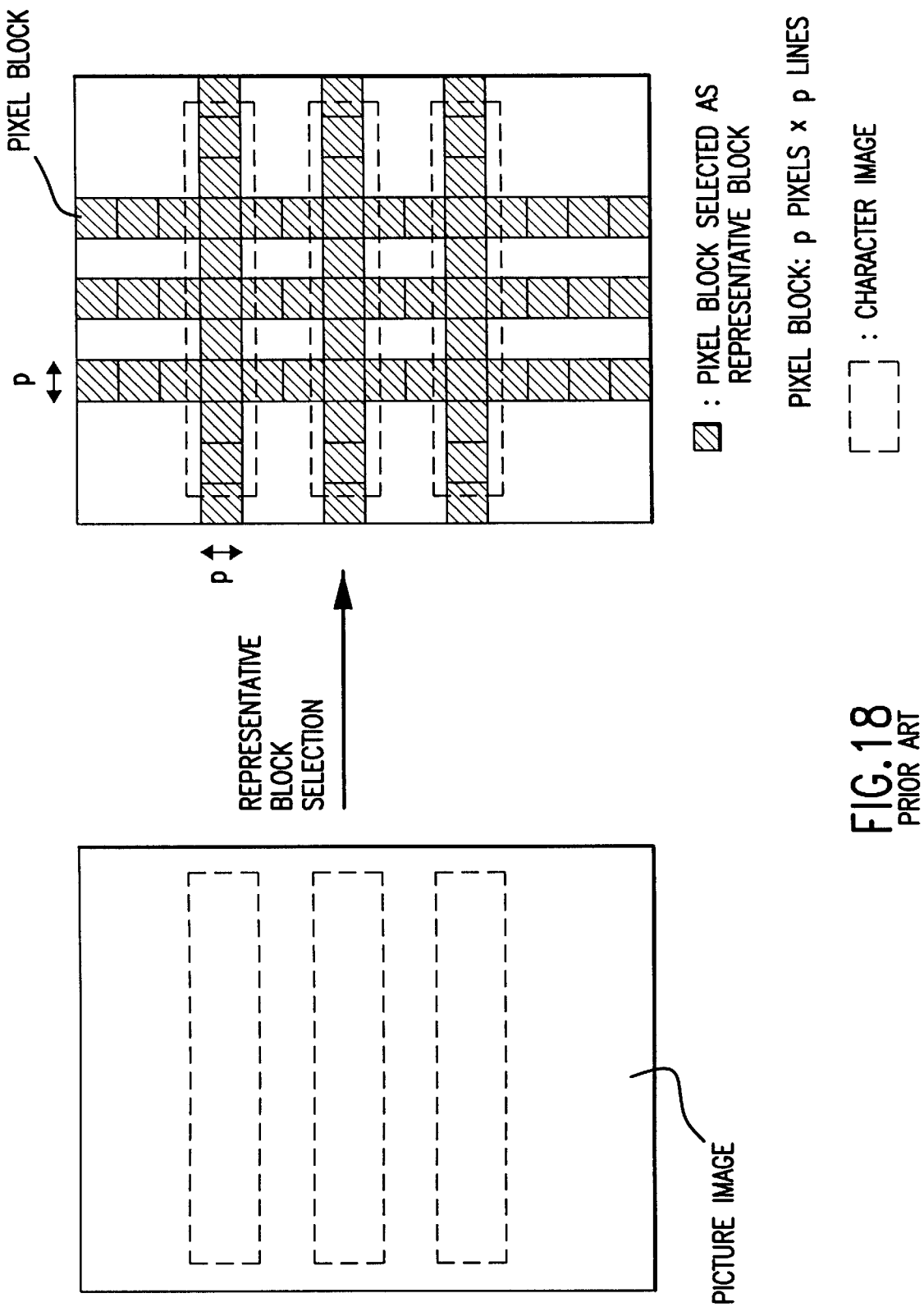
FIG. 18 shows another example of selection of representative blocks in the conventional example 4.

First, in the image dividing part 901, the image information is divided into plural divided images. As the method of dividing, division of the image information into rectangular areas to {the number of pixels in the horizontal direction× (n×p lines)} as shown in FIG. 12 can be employed (p is the number of lines of pixel block which is a unit of the coding process, and n is a positive integral number). Then, in the selecting part 902, either coding part 1 or coding part 2 is selected, and the divided image information is inputted to the selected coding part. The coding part to which the divided image information is inputted carries out the code amount control process and variable-length coding process which are the same as the first embodiment.

In this embodiment, the image information is divided by the image dividing part 901, and then the code amount control and coding process (collectively referred to as coding process with code amount control) are conducted per every divided image information. In the coding process with code amount control, the target image information should be temporarily memorized until the process is completed. Therefore, in the present embodiment, if the coding process with code amount control on each divided image information can be completed before the next divided image information is inputted, it is possible to reduce the memory capacity for temporary storage. Moreover, parallel disposing of the coding parts enables the consecutive execution of the image inputting process and the coding process with code amount control even in the case where the speed of image inputting to the coding device is higher than the process speed of the coding process with code amount control.

According to the fifth and sixth embodiments of the image information coding apparatus of the present invention, the time taken for determination of the coding parameter is restrained by the predetermined number of times of coding as described above, and thereby the time required for coding can be determined in advance. Consequently, the pipeline processing or parallel processing can be easily carried out.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image information coding apparatus comprising:

block generating means for dividing an image information into pixel blocks each of which consists of a predetermined number of pixels;

block selecting means for selecting a current pixel block in a position different from that of a pixel block selected in a preceding block line in a main scanning direction from said pixel blocks generated by said block generating means;

parameter setting means for setting a coding parameter to a predetermined value;

first variable-length coding means for conducting variable-length coding of said current pixel block selected by said block selecting means using said coding parameter;

code amount controlling means for changing a value of said coding parameter so that the code amount of said current pixel block selected by said block selecting means and coded by said first variable-length coding means is not more than a predetermined code amount; and second variable-length coding means for conducting variable-length coding of all of said pixel blocks using a coding parameter changed by said code amount controlling means.

2. The image information coding apparatus according to claim 1, further comprising:

image dividing means for dividing said image information in a sub scanning direction into portions having a height of two or more of a height of the pixel blocks;

said block generating means dividing said image information divided by said image dividing means into pixel blocks; and said second variable-length coding means conducting variable-length coding of all of said pixel blocks in said image information divided by said image dividing means.

3. The image information coding apparatus according to claim 1, further comprising:

random number generating means for generating a random number; and said block selecting means specifying a pixel block to be selected in accordance with said random number generated by said random number generating means.

4. The image information coding apparatus according to claim 1, wherein said block selecting means selects a pixel block at a predetermined interval.

5. The image information coding apparatus according to claim 4, wherein division of the number of pixel blocks in the main scanning direction of said image information by said predetermined interval in selecting said pixel block generates a remainder.

6. The image information coding apparatus according to claim 4, wherein said block selecting means selects a unit of continuous N pixel blocks at said predetermined interval, wherein N is an integral number not less than 2.

7. An image information coding apparatus comprising:

block generating means for dividing an image information into pixel blocks each of which consists of a predetermined number of pixels;

block selecting means for selecting a current pixel block in a position different from that of a pixel block selected in a preceding block line in a main scanning direction from said pixel blocks generated by said block generating means;

parameter setting means for setting a coding parameter to a predetermined value;

first variable-length coding means for conducting variable-length coding of said current pixel block selected by said block selecting means using said coding parameter;

code amount controlling means for changing the value of said coding parameter so that the code amount of said current pixel block selected by said block selecting means and coded by said variable-length coding means differs from a predetermined code amount by no more than a predetermined range, after repeating said variable-length coding by said first variable-length coding means no more than a predetermined number of times; and second variable-length coding means for conducting variable-length coding of all of said pixel blocks using the coding parameter generated by said code amount controlling means after the repeated variable-length coding.

8. The image information coding apparatus according to claim 7, wherein said code amount controlling means terminates the variable-length coding by said first variable-length coding means if the code amount of the current pixel block selected by said selecting means and coded by said first variable-length coding means falls within the predetermined range including said predetermined code amount before the number of times of repetition of the variable-length coding by said first variable-length coding means reaches the predetermined number of times.

9. The image information coding apparatus according to claim 7, further comprising:

random number generating means for generating a random number; and said block selecting means specifying a pixel block to be selected in accordance with said random number generated by said random number generating means.

10. The image information coding apparatus according to claim 7, wherein said block selecting means selects a pixel block at a predetermined interval.

11. The image information coding apparatus according to claim 10, wherein division of the number of pixel blocks in the main scanning direction of said image information by said predetermined interval in selecting said current pixel block generates a remainder.

12. The image information coding apparatus according to claim 10, wherein said block selecting means selects a unit of continuous N pixel blocks at said predetermined interval, wherein N is an integral number not less than 2.

13. An image information coding method comprising the steps of:

(a) dividing an image information into pixel blocks each of which has a predetermined number of pixels;

(b) selecting a current pixel block in a position different from that of a pixel block selected in a preceding block line in a main scanning direction from said current pixel block;

(c) setting a coding parameter to a predetermined value;

(d) conducting variable-length coding of said current pixel block selected in step (a) using said coding parameter;

(e) changing a value of said coding parameter so that die code amount of said current pixel block selected in step (b) and coded in step (d) is not more than a predetermined code amount; and (f) conducting variable-length coding of all of said pixel blocks using a coding parameter changed in step (e).

* * * * *